March 3, 1931.  W. L. LLOYD, JR  1,795,175
VOLTAGE TESTING RECORDER
Filed March 11, 1926   2 Sheets-Sheet 1

Inventor:
Will L. Lloyd Jr.,
by
His Attorney.

March 3, 1931. W. L. LLOYD, JR 1,795,175
VOLTAGE TESTING RECORDER
Filed March 11, 1926  2 Sheets-Sheet 2

Inventor:
Will L. Lloyd Jr,
by
His Attorney.

Patented Mar. 3, 1931

1,795,175

UNITED STATES PATENT OFFICE

WILL L. LLOYD, JR., OF PITTSFIELD, MASSACHUSETTS, ASSIGNOR TO GENERAL ELECTRIC COMPANY, A CORPORATION OF NEW YORK

VOLTAGE-TESTING RECORDER

Application filed March 11, 1926. Serial No. 94,019.

My invention relates to testing recorders and a test method and is particularly adapted for testing insulators such as those used on high voltage transmission lines.

The extensive use of high voltage transmission systems makes it desirable to provide suitable means for testing the insulators used on such transmission lines in order that defective insulators may be located and replaced before damage results. My invention relates to a simple yet reliable tester for this purpose and one which produces permanent records of the condition of the insulators tested by a novel method of chemically or photographically reproducing the effects of electric discharges which reveal the relative insulating characteristics of the insulators tested. Another important feature of my invention is automatic means for advancing the record sheet so that the plurality of insulators of a string may be tested one after the other and records made of such tests without the necessity of the operator coming in close proximity to the insulators or the testing device.

Figure 1:
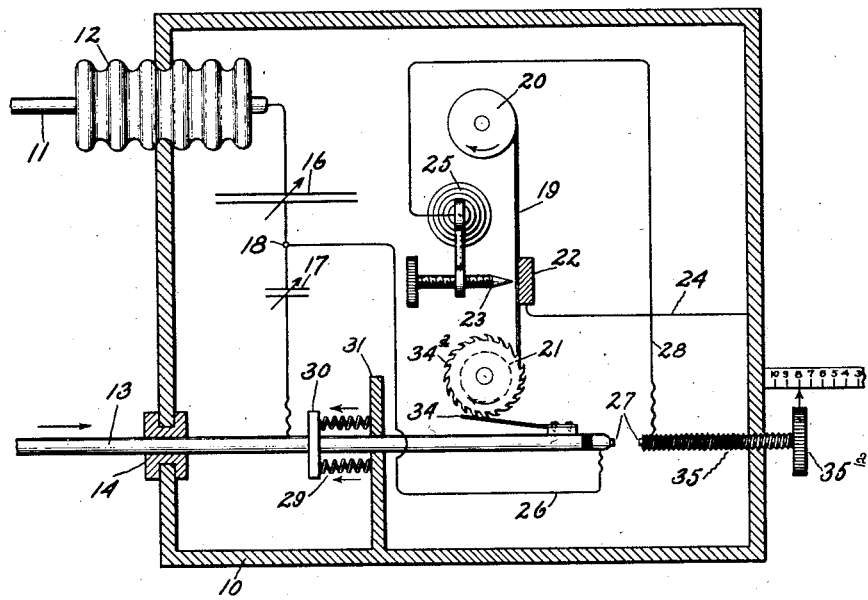
Figure 2:
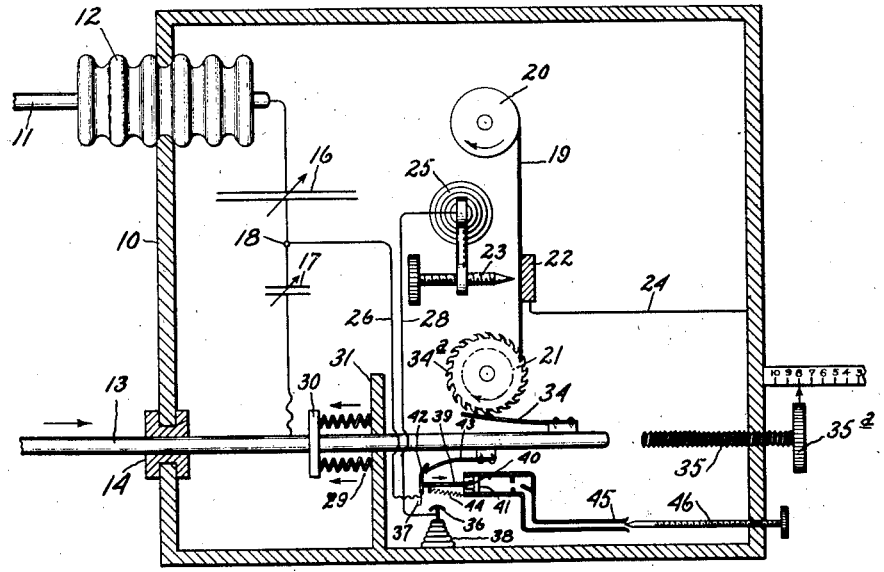
Figure 3:
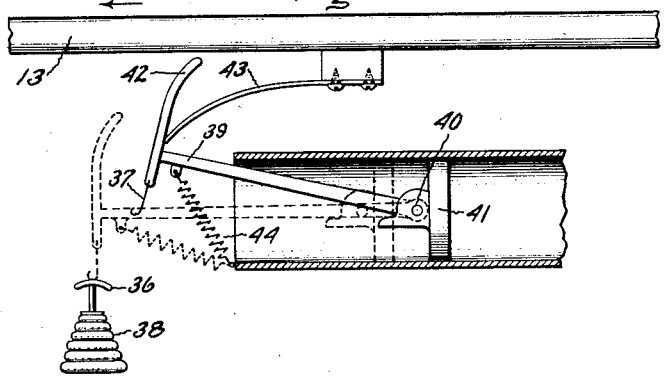
Figure 4:
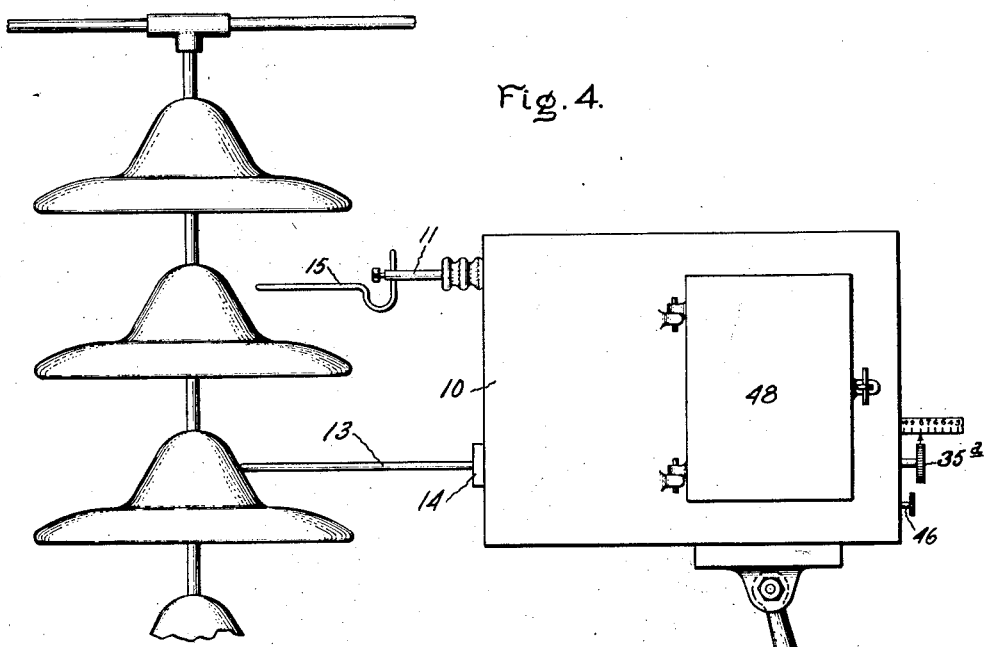
Figure 5:
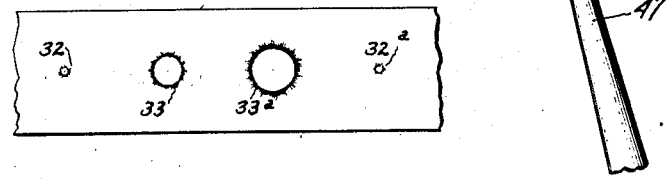

The features of my invention which are believed to be novel and patentable will be pointed out in the claims appended hereto. For a better understanding of my invention, reference is made in the following description to the accompanying drawings in which Fig. 1 shows a cross section through my improved testing device arranged for automatic advancement of a record sheet; Fig. 2 shows a similar view of a modfication of the tester having automatic means for timing the exposure of the recording device; Fig. 3 represents the timing device shown in Fig. 2 in different operating positions; Fig. 4 shows an exterior view of the testing device and the manner of applying it to an insulator to be tested; and Fig. 5 represents the type of photographic records produced by the tester.

Referring to the drawings and in particular to Fig. 1, the apparatus is preferably contained in and on a box-like casing 10, which may be made of sheet metal, or other suitable material not necessarily metallic. A stationary terminal 11, secured in an insulator 12, passes through a wall of the box 10. Below terminal 11 is a second terminal rod 13 which is preferably arranged to have a limited sliding movement through a bushing 14. These terminals are arranged to bridge the insulator to be tested and the upper terminal may have a section 15 as shown in Fig. 4 arranged so as to be adjusted up and down to facilitate the testing of different sized insulators. Between the terminals 11 and 13 in the casing is a large condenser 16 and a smaller condenser 17. These condensers may be built as a unit with a suitable tap or taps brought out corresponding to the tap 18, or the condenser plates may be made adjustable. The large condenser section 16 is primarily for the purpose of protection and normally takes the lesser portion of any potential to which the terminals may be subjected. The condenser section 16 should be capable of absorbing all of the potential across the terminals in case the condenser section 17 should be short circuited. The voltage across the condenser section 17 is used for making the record on a photographic or other suitable record sheet 19. This record sheet is arranged to be wound from a spool 20 to a spool 21 between an electrode 22 and a pointed adjustable electrode 23. Electrode 22 is connected to terminal 13. Where the box 10 is metallic, it, with wire 24, serves as a common connection between the electrode 22 and terminal 13. The pointed electrode 23 is suitably supported on an insulator 25 and is arranged to be connected to the tap 18 between the two condenser sections through conductor 26, insulated contacts 27 and conductor 28. When the terminals 11 and 13 are pressed against the extremities of an insulator the terminal rod 13 slides inward against the compression of a spring 29, which spring is arranged to be compressed between a collar 30 on the terminal rod 13 and a stationary abutment 31 through which the terminal rod passes. This sliding movement of the terminal rod 13 automatically closes the contacts at 27 and connects the film electrodes 22 and 23 across the condenser section 17.

In this condition a voltage proportional to the voltage across the insulator is impressed between the electrodes 23 and 22 so that an electric brush discharge takes place through the photographic film and leaves a record which upon development becomes a measure of such voltage. Fig. 5 shows the general nature of the records thus obtained. The area represented within the irregular circles has been exposed and this exposed area is proportional to the impressed voltage. The nature of the record thus obtained varies somewhat with the duration of exposure and also with the direction of the discharge through the film. When an insulator is defective the voltage across it is low and the record is small as at 32 and 32a. When the insulator is good the voltage across it is comparatively high and the record is comparatively larger. Thus records 33 and 33a indicate good insulators. Instead of a photographic film I may use a chemically treated strip such that the discharge may change the color of the strip, for instance, from white to black, or from pink to blue, over the area of the strip subjected to the discharge. In certain cases even a plain piece of paper might be sufficient, the paper being punctured, or blackened, or dotted, or otherwise marked to indicate the voltages proportional to the voltages being measured. In such cases, subsequent development of the strip in a dark room would be unnecessary.

The nature of the exposure may be regulated by adjusting the electrode 23 toward or away from the electrode 22. This gap should generally be proportional to the normal average voltages across the insulators to be tested. This adjustment makes the apparatus available for testing insulators designed for a wide variety of voltages. By comparing the records as thus obtained with each other, or with a record obtained under similar conditions from a standard insulator known to be in good condition, the defective insulators may be quickly detected. In addition to the adjustment above mentioned the condenser sections 16 and 17 may be made adjustable or variable as indicated, thereby greatly increasing the voltage range of the instrument. For relatively high voltages across the terminals 11 and 13, it may be desirable to adjust the capacitance or impedance of 16 to be even smaller than that of 17 so as not to have too high a voltage on the recording circuit. Of course when such adjustments are made different calibrations of the record will be necessary.

When the terminals are removed from the insulator to pass to the next insulator, the spring 29 automatically opens the contacts 27 and a pawl 34 secured to the terminal rod 13 advances a ratchet wheel 34a on spool 21 so as to advance the record sheet for the next record. The extent of advancement of the record sheet may be altered by adjusting the position of the threaded contact rod 35 by means of the thumb-piece 35a. This contact rod serves as a stop for the inward movement of rod 13. This varies the active stroke of the pawl 34 with respect to the ratchet wheel 34a. To obtain a fairly uniform advance of the record sheet as the diameter of the roll on the spool 21 increases, the active stroke of the pawl 34 should be gradually shortened by screwing the rod 35 inward.

With the apparatus shown in Fig. 1 the timing of the exposure is left to the judgment of the operator and is determined by the length of time he holds the terminals 11 and 13 firmly against the insulator to be tested. Fig. 2 shows an arrangement for automatically timing the duration of the exposure. In this case the contacts shown at 27 in Fig. 1 are replaced by the contacts 36 and 37 shown in Fig. 2. This feature is more clearly shown in Fig. 3. The contact 36 is mounted on an insulator 38 and the moving contact 37 is carried on an arm 39 pivoted at 40 to a dash-pot piston 41. The arm 39 has a curved headpiece 42 which cooperates with a pawl member 43 on the sliding terminal rod 13. When the rod 13 is moved to the left, pawl 43 engages with 42, lifts the arm 39 to the position shown in full lines in Fig. 3 and carries the contact 37 past and over contact 36 without making contact. When the testing terminals are forced against an insulator and the rod 13 is moved to the right, the arm 39 is moved more slowly in the same direction by a spring 44 and in doing so it wipes contact 37 against and over contact 36, as shown in the dotted lines in Fig. 3. In this way the duration of closure of the circuit 18, 26, 37, 36, 28 of the electrode 23 is timed by the characteristics of the dash-pot. The duration of exposure may be controlled by controlling the extent of opening of an outlet 45 for the dash-pot 41 by means of an adjustable plug rod 46. In this way the duration of exposure of the film can be made exactly correct and thereafter maintained constant for any number of subsequent tests. The remainder of the apparatus shown in Fig. 2 is similar to that of Fig. 1.

The photographic film is protected from external light by the enclosing casing 10 and after any desired number of insulators are tested in consecutive order the film is developed and any defective insulator may be found by referring to the developed record.

For field use the device may be mounted on a long insulating pole 47 so that the testing of insulators in use on high voltages lines may be readily carried out without danger to the operator. The adjusting devices 35 and 46 are preferably accessible from the exterior of the box as represented. A door 48 is provided for access to the interior of the box.

While I have described my invention as a device for testing insulators it may be used of course for measuring the potential across any other impedance or resistance device. One or more of the automatic features may be omitted and various other changes in the arrangement of the parts may be made without departing from the invention.

What I claim as new and desire to secure by Letters Patent of the United States, is:

1. A voltage testing recorder comprising terminals adapted to be exposed to the potential to be measured, a high impedance and a low impedance connected in series between said terminals, electric discharge electrodes arranged to be connected across said high impedance, and means for recording electric discharges between said electrodes.

2. A voltage testing recorder comprising terminals adapted to be exposed to the potential to be measured, condenser sections of relatively large and small capacity connected in series between said terminals, electric discharge electrodes arranged to be momentarily connected across said small capacity, and means for chemically recording electrical discharges between said electrodes.

3. Electrical recording apparatus comprising a support, electric terminals on said support one of which is movable with respect to said support, a record sheet carried by said support, means for producing a record on said record sheet indicative of an electric quantity to which said terminals may be subjected, and means responsive to the movement of said movable terminal for advancing said record sheet.

4. An insulator testing and test recording apparatus comprising a casing, electric discharge electrodes within said casing, terminals on the exterior of said casing for energizing said electrodes, a record sheet movably mounted between said electrodes, and automatic means responsive to the pressing of said terminals against an insulator to be tested for advancing said record sheet.

5. A voltage testing recorder comprising a casing, terminals adapted to be exposed to the potential to be measured extending from the interior to the exterior of said casing, one of said terminals having a limited movement with respect to said casing, electric discharge electrodes in said casing, circuits for subjecting said electrodes to a potential difference which is proportional, but less than any potential existing across said terminals, a record sheet movably supported between said electrodes, means for advancing said sheet past said electrodes, and means responsive to an external pressure against said movable terminal for operating said sheet advancing means.

6. A recording device comprising a casing, electric terminals extending from the interior to the exterior of said casing, one of said terminals being movable with respect to said casing, recording apparatus within said casing, an electric circuit associated with said terminals for controlling the operation of said recording apparatus, normally open contacts in said circuit within the casing, means responsive to the movement of said movable terminal for momentarily closing said contacts, and adjustable means for timing the duration of closure of said contacts.

7. A recording device comprising a record sheet, electrical means for producing a record on said sheet, means for moving said sheet past said record producing means, an electric terminal movable with respect to said record producing means for energizing the latter, a normally open electric circuit between said terminal and said electrical recording means, and means responsive to the movement of said movable terminal for closing said circuit and moving said sheet.

8. A recording device comprising a movably supported record sheet, electrical means for producing a record thereon, a movable terminal for energizing said electrical means, a normally open electric circuit between said terminal and said electrical means, means responsive to the movement of said terminal in one direction for closing said circuit, and means responsive to the movement of said terminal in another direction for moving said sheet.

9. The method of testing insulators which consists in subjecting the insulator to be tested to a high potential producing an electric discharge by a potential proportional to the potential to which the insulator is subjected, timing the duration of such discharge and photographing such timed electric discharge.

10. The method of testing a string of insulators while in use on a high voltage circuit which consists in producing electric discharges proportional to the voltages across the respective insulators of the string and chemically recording the character of such discharges in such a manner that a comparison of the chemical records thus produced will reveal which of said insulators are good and which are defective.

In witness whereof, I have hereunto set my hand this 19th day of February, 1926.

WILL L. LLOYD, Jr.